United States Patent
Roth et al.

(10) Patent No.: US 6,840,023 B2
(45) Date of Patent: Jan. 11, 2005

(54) COMBINATION OF A BALER AND WRAPPING APPARATUS, AND A CHASSIS TO ACCOMMODATE THEM

(75) Inventors: Arsene Roth, Gray (FR); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 364 days.

(21) Appl. No.: 09/945,418

(22) Filed: Aug. 30, 2001

(65) Prior Publication Data

US 2002/0043048 A1 Apr. 18, 2002

(30) Foreign Application Priority Data

Sep. 7, 2000 (DE) .......................................... 100 44 166

(51) Int. Cl.$^7$ .............................................. B65B 11/28
(52) U.S. Cl. .............................. 53/116; 53/204; 53/211
(58) Field of Search ............................ 53/204, 211, 216

(56) References Cited

U.S. PATENT DOCUMENTS

| | | | | |
|---|---|---|---|---|
| 3,818,674 A | * | 6/1974 | Tull, III ........................ | 53/124 |
| 4,167,844 A | * | 9/1979 | Freimuth et al. ............. | 56/343 |
| 4,669,257 A | | 6/1987 | Rossato et al. ............... | 56/341 |
| 4,730,446 A | | 3/1988 | van der Lely ................ | 56/341 |
| 4,986,057 A | * | 1/1991 | Gainforth .................... | 53/556 |
| 5,048,271 A | * | 9/1991 | Walton ........................ | 53/587 |
| 5,689,934 A | * | 11/1997 | Scherer et al. ................ | 53/399 |
| 5,822,967 A | * | 10/1998 | Hood et al. ................... | 56/341 |
| 6,405,510 B1 | * | 6/2002 | Viaud .......................... | 53/118 |

FOREIGN PATENT DOCUMENTS

| | | |
|---|---|---|
| DE | 41 20 733 | 1/1993 |
| DE | 195 44 109 | 5/1997 |
| DE | 200 05 963 | 6/2000 |
| EP | 0 865 723 | 9/1998 |
| GB | 960 626 | 6/1964 |

* cited by examiner

*Primary Examiner*—Scott A. Smith
*Assistant Examiner*—Gloria R. Weeks

(57) ABSTRACT

A combined large round baler and whole bale wrapping apparatus includes a wheeled chassis carrying and extending between the baler and the wrapping apparatus and including tandem wheels carried at opposite ends of walking beams. A lower region of the baler is secured to the front of the chassis. First and second braces are fixed to, and diverge upwardly from, a fore-and-aft middle location of the chassis respectively to the hinge joint between the front and rear sections of the baler and a wrapping arm assembly. A tie-bar extends between the two braces. The wrapping apparatus includes a wrapping table mounted to the chassis for fore-and-aft movement between a receiving position, wherein it is disposed for receiving a bale formed by the baler, and a wrapping position, wherein it is located centrally below the wrapping arm.

10 Claims, 1 Drawing Sheet

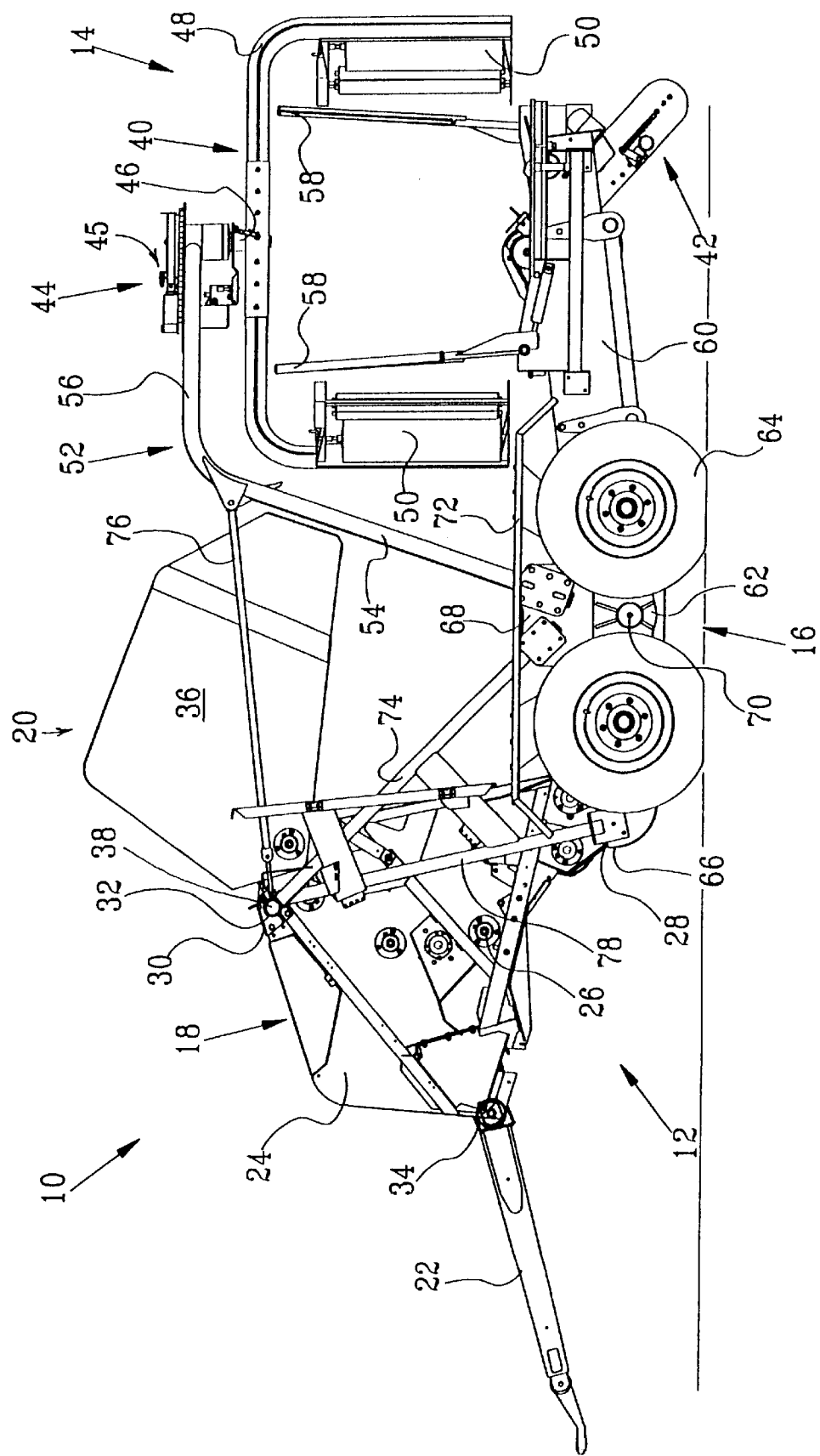

COMBINATION OF A BALER AND WRAPPING APPARATUS, AND A CHASSIS TO ACCOMMODATE THEM

FIELD OF THE INVENTION

This invention concerns a large round baler in combination with a wrapping apparatus for completely enveloping a bale formed by the baler.

BACKGROUND OF THE INVENTION

EP-A1-865 723 discloses a baler/wrapping apparatus combination in which a chassis is provided, into which a baler is installed and onto which a bale wrapping apparatus is placed. The chassis and frame laterally surround the baler and the wrapping apparatus.

DE-A1-41 20 733 shows a combination of a baler with a wrapping apparatus and a chassis in which two wheels are provided close to each other, similar to a tandem axle. The baler and chassis combination shown therein leaves open how the forces can be controlled in an actual embodiment.

The problem to be solved is that of providing a combination baler and wrapping apparatus which is robust while being of a size and weight that does not result in high manufacturing costs.

SUMMARY OF THE INVENTION

According to the present invention, there is provided and improved combination baler and whole bale wrapping apparatus.

An object of the invention is to provide a combined baler and whole bale wrapping apparatus which is of a robust, relatively inexpensive construction.

A more specific object of the invention is to provide a combined baler and whole bale wrapping apparatus wherein a robust, wheeled chassis is located between the components making up the baler and the wrapping apparatus.

Yet a more specific object is to provide a combined baler and whole bale wrapping apparatus, as set forth in the immediately preceding object, wherein a lower section of the chassis serves to connect a carrying axle, the baler components are supported at the front of the chassis and also by at least one brace running between the chassis and an upper location of the baler.

Still another object of the invention is to provide a combined baler and wrapping apparatus including a wheeled chassis, with the baler including wrapping components together with an axle, which are removable from the chassis of the combined apparatus, the axle been adapted for receiving wheels so that the baler may be used apart from the wrapping apparatus.

These and other objects of the invention will become apparent from a reading of the ensuing description together with the appended drawing.

BRIEF DESCRIPTION OF THE DRAWING

The sole FIGURE of the drawing is left side elevational view of a combined baler and whole bale wrapping apparatus supported from a common chassis in accordance with the principles of the present invention.

DESCRIPTION OF THE PREFERRED EMBODIMENT

Referring now to the drawing, there is shown a combined implement 10 including a baler 12, a wrapping apparatus 14 and a chassis 16. The combined implement 10 is adapted to be towed across a field by an agricultural tractor (not shown) so as to take up harvested crop, such as silage grass, compress the crop into bales, and finally to wrap the bales in an airtight covering.

The baler 12 in the shown embodiment is designed as a large round baler, which however is not mandatory. Instead, a rectangular baler could be used. An example of the bale forming arrangement of the baler 12 is embodied in the commercially available John Deere Model 575 Round Baler. In its usual condition, the lower section of the baler is provided with a carrying axle (not shown) on which the baler can be transported. Because the bale forming arrangement of the baler is linked with the chassis 16, a carrying axle is superfluous; however, such an axle continues to be suitable for connection with support wheels and can be removed from the combination and be operated independently of the wrapping apparatus 14.

The baler 12 includes, among other things, a front section 18, a rear section 20, and a draft tongue 22. The front section 18 is provided with laterally spaced side walls 24 between which rollers 26 extend, which are positioned in an arc of a circle, in order to define a forward part of the circumference of a bale-forming chamber (not shown). In a front, lower location of the front section 18, a space has been created for accommodating the in-coming crop delivered by a crop gathering arrangement, such as a pick-up (not shown), as is generally known. A flange 28 is provided in a lower location of the front section 18, which, in the John Deere Model 575 baler, serves to connect a carrying axle. In other commercially available balers, such an existing flange may be used for a different purpose. This flange 28 is permanently linked with the side walls 24 and to a reinforcing plate (not shown) located between the walls and thus is suitable for transferring great forces. In an upper location, the side walls 24 are rigidly connected with a cross member 30, which at the external sides of the side walls 24 is provided with a pipe 32. Apart from the purpose explained below, this pipe 32 also serves for easier conveyance during production and thus is already provided as part of a conventional baler. Finally, a cross member 34, which is connected to the draw bar 22, extends between a lower forward location of the side walls 24. This concludes the description of the front section 18, because the remaining individual components are known and irrelevant to the invention.

Sometimes, the rear section 20 is referred to as the bale discharge gate and is designed in a known manner. The rear section 20 is provided with laterally spaced side walls 36, between which rollers (not shown) extend which also are positioned in an arc of a circle, in order to define a rear part of the circumference of the bale-forming chamber. Furthermore, cross members (not shown) are provided between the side walls 36 in order to rigidify the rear section 20. The front and rear sections 18 and 20, respectively, are interconnected by a pivot bearing 38, which is located inwardly of the pipes 32 at rear upper corner locations of the front section 18 and in a front upper corner location of the rear section 20, and allows a vertical pivoting or swiveling motion of the rear section 20, which is initiated by hydraulic cylinders (not shown).

The drawbar 22 has a vertically rigid connection with the cross member 34, which in most cases, however, is adjustable, and normally serves to connect the baler 12 to a traction vehicle (not shown), such as an agricultural tractor, but here serves to connect the entire combination 10 to the tractor. Because of the rigid connection between the drawbar 22 and the front section 18, each vertical movement of the drawbar 22 also is initiated in the front section 18.

The wrapping apparatus 14 essentially is provided with two components, namely a wrapping arm 40 and a wrapping table 42. The type of wrapping apparatus as shown herein is generally known in the market, and has the task of wrapping and hermetically sealing a bale formed in the baler 12, so that silage feed can be produced.

The wrapping arm 40 includes a drive 44, for example, with a motor and transmission assembly 45, which includes a vertical drive shaft 46. Furthermore, the wrapping arm 40 also has a wrapping rotor 48 in the form of an upside-down "U" to which the vertical arm of the rotor is attached with a film dispenser 50. The wrapping rotor 48 is centrically connected with the drive shaft 46, and is rotated by the drive 44 around the central axis of the drive, while in the free inner space, the bale is stored on the wrapping table 42 and rotated by the table around a horizontal axis, as is known. The wrapping arm 40 is suspended from a brace 52, having a pair of members, each of which is similar to an upside-down "J" defined by a mainly vertical arm 54 and a mainly horizontal arm 56, which enclose an obtuse angle of approximately 110° between them. Each nearly vertical arm 54 extends so that the wrapping rotor 48 can be rotated freely above the chassis 16, and each horizontal arm 56 extends rearwardly and inwardly to the rotor drive motor and transmission assembly 45 and has a longitudinal component which is longer than the radius of the wrapping rotor 48, so that the wrapping rotor 48 does not knock against the vertical arm 54 during the motion of rotation of the rotor.

The wrapping table 42 does not have a rotating design and contains a roller (not shown) in the front and rear end section, around which sagging belts (also not shown) are wound, in order to accept a bale on the upper half of the conveyor and to shift it during rotation. The wrapping table 42 is movably supported along the chassis 16 in a rail with a U profile, not shown. By means of a hydraulic motor (not shown), the wrapping table 42 can be moved below the rear section 20 in order to accept a bale, and then moved with the bale to the center below the wrapping arm 40 where, while being shifted in rotation, the bale is surrounded by film dispensers 50. DE 41 20 733 discloses such a conveyor arrangement for placing a wrapping table for receiving a bale from the baler and for moving the table, together with the bale, to a location spaced rearward of the baler where wrapping apparatus is located. In lieu of using the wrapping table 42 as a conveyor for moving the baler from the baler to the wrapping apparatus 14, a belt or chain conveyor or the like could be provided on the top of the chassis 16. Finally, the wrapping table 42 is tipped towards the rear, as shown in the drawing, and the wrapped bale is deposited on the ground, as is generally known. Finally, film holders 58 are provided between the film dispensers 50 and the wrapping table 42, which hold the film at the beginning of the wrapping process and cut the film upon completion of the process.

The chassis 16 contains two cheeks 60, which run parallel to each other, two tandem axle supports 62 and two wheels 64 on each side. The chassis 16 accommodates the baler 12 at a front end location and the wrapping apparatus 14 at a rear end location. Further, the swiveling axis of the tandem axis support 62 at the cheeks 60 is so selected that the weight in front and back remains manageable regardless of whether the bale, which may weigh up to 1200 kg, is in the baler 12 or is displaced to the rear and located at the wrapping apparatus 14.

The cheeks 60 are made of tubing having a rectangular cross section, but may be made of U-profile or C-profile channel members, or similar construction, and are rigidly connected by means of cross members. Flanges 66 are provided at a front location of the chassis 16 and match and are secured, as by screws, to the flanges 28 of the baler 12. By this method, the baler 12 is primarily attached to the chassis 16. On the inside of the cheeks 60, the aforementioned rails are provided with a U-section, in which the wrapping table 42 can be moved longitudinally to the combination 10. The consoles 68 are rigidly fixed to the outside of the cheeks 60, in horizontal spaced relationship to, and to the rear of, the flanges 28, 66. Tandem axle supports or walking beams 62 are respectively vertically pivotally mounted to the consoles 68 by bearings 70. Because the chassis 16 is connected with the baler 12 via the flanges 28, 66, the cheeks 60 are located below the baler 12, thus resulting in a narrower design. Ultimately, in this embodiment, the outside of each cheek 60 is provided with a fender 72. Of course, the chassis 16 is also provided with brakes, lighting, suspension, and the like, which, however, can be taken for granted, and, therefore, do not have to be described in detail.

Each tandem axle support or walking beam 62 is designed in the form of a plate, which axially, or essentially axially pivots around the bearing 70, and in each end location is provided with one of the wheels 64. The wheels 64 are spaced at a narrow distance, support the combination 10 on the ground, and ensure a small distance between the underside of the cheeks 60, being the lowest point of the combination 10, and the ground.

A first brace 74 and a tie bar 76 are provided at each side of the combination 10 to connect the baler 12 and wrapping apparatus 14 with the chassis 16. The first brace 74 extends between the pipe 32 in the upper rear corner location of the front baler section 18 and the console 68, and diverges from an imaginary line between the pipe 32 and the flanges 28, 66 in order to form part of a triangle. Since the location of the pipes 32 are coincident with the bearings 38 about which the discharge gate 20 swivels or pivots, the first brace 74 is ideally located for transferring the loads to the chassis 16. The first brace 74 is developed as a straight pipe, which can be subjected both to tensile stress and pressure, and because of its straight design is not liable to kink. Between the console 68, the pipe 32, and the flanges 28, 66, a solid triangle is formed which secures the baler 12 against tilting in the direction of travel. The first brace 74 is connected to the console 68 by means of straps, clamp straps, screws, or similar connections.

Each tie-bar 76 extends between one of the first braces 74 and one of the sides of the brace 52 which, according to the drawing, essentially form a "V" and thus appear to diverge upwardly. The tie-bar 76 extends between locations of the baler 12 and the wrapping apparatus 14, which are almost at the respective tops of these structures. Specifically, on the one hand, the tie-bar 76 engages the pipe 32, and on the other hand, it engages in the transitional area between the vertical and horizontal legs 54 and 56, respectively, of a respective side of the brace 52. The tiebar 76 can be provided with a clamp screw, which allows adjusting the length. In other embodiments, the tie-bar 76 may engage at different points, so long as it ensures that it is able to transmit the load.

Finally, a third brace 78 is provided, which extends between the pipe 32 and the area of the flanges 28, 66. This brace 78, however, does not serve to fix the baler 12 on the chassis 16, but to mount the components of the baler 12 or the combination 10, such as grease lines protective devices, electrical lines, hydraulic lines, etc.

From the above description, it follows that the line between the flanges 28, 66 and the pipe 32, the first brace 74, the tie-bar 76, and the brace 52 form a type of latticework, which is intrinsically stable. Specifically, the first braces 74 make it possible to conduct the vertical forces initiated by the drawbar 22 to the chassis 16, without excessive load upon the flanges 28, 66. Excessive forces can also be avoided by virtue of the tandem axle supports or walking beams 62 being vertically pivotally mounted to the cheeks 60 and by the advantageous distribution of the weight of the combination 10 in front and to the rear of the bearings 70.

The above description of the embodiment indicates that the cheeks 60, braces 54, 74 and 78 and the tie-bars are provided on each side of the combination 10, i.e., they are doubled, which, however, is not required for all of these parts.

Overall, in contrast to the prior art, the present invention offers a simpler and narrower design, which avoids providing or especially forming the press 12 with an additional frame.

Having described the preferred embodiment, it will become apparent that various modifications can be made without departing from the scope of the invention as defined in the accompanying claims.

What is claimed is:

1. In a combination including a baler, a bale wrapping apparatus for entirely enveloping a bale formed by the baler and a wheeled chassis supporting the baler and the wrapping apparatus in their entirety, the improvement comprising: said wrapping apparatus being located entirely behind said baler; and a brace structure having a lower end region fixed to said chassis at least at a location between said baler and bale wrapping apparatus and having front and rear upper regions respectively coupled to said baler and said bale wrapping apparatus.

2. The combination defined in claim 1 wherein said baler is a large round baler including front and rear sections, with said rear section having an upper front region vertically pivotally mounted to an upper rear region of said front section; and said upper front region of said brace structure being coupled at said upper rear region of said front section of said baler.

3. The combination defined in claim 2 wherein said brace structure includes at least one straight brace having a lower end fixed to said chassis at said location between said baler and bale wrapping apparatus and having an upper end fixed to said upper rear region of said front section of said baler.

4. The combination defined in claim 1 wherein said brace structure includes a first brace extending between said chassis and said baler; and a second brace extending between said chassis and said wrapping apparatus.

5. The combination defined in claim 4 and including at least one tie-bar extending between said first and second braces.

6. The combination defined in claim 4 wherein a console is fixed to said chassis; and said first and second braces having respective lower ends connected to said console.

7. The combination defined in claim 6 wherein said brace structure includes a third brace extending between a front region of said chassis and said upper rear region of said first section of said baler.

8. The combination defined in claim 6 wherein said first and second braces diverge upwardly from each other; and said tie-bar extending substantially parallel to said chassis, whereby said braces and tie-bar are fashioned similar to a section of latticework.

9. The combination defined in claim 4 wherein said chassis includes a pair of laterally spaced, fore-and-aft extending walking beams mounted for pivoting about a transverse axis located between said baler and wrapping apparatus; and a wheel being mounted to each of opposite ends of each walking beam.

10. The combination defined in claim 2 wherein said upper rear region of said front section of said baler is located approximately vertically above a forward end region of said chassis.

* * * * *